United States Patent [19]

Meinhold et al.

[11] Patent Number: 4,659,577
[45] Date of Patent: Apr. 21, 1987

[54] METHOD FOR THE DECAFFEINATION OF ROASTED COFFEE EXTRACTS

[75] Inventors: James F. Meinhold, Boonton, N.J.; Joseph A. Musto, Bronx, N.Y.; Karl C. Kramer, Dunellen, N.J.; Martin Gottesman, deceased, late of Paramus, N.J., by Karen Gottesman, executrix

[73] Assignee: General Foods Corporation, White Plains, N.Y.

[21] Appl. No.: 793,505

[22] Filed: Oct. 31, 1985

Related U.S. Application Data

[63] Continuation-in-part of Ser. No. 655,198, Sep. 27, 1984, abandoned.

[51] Int. Cl.$^4$ ............................................. A23F 5/22
[52] U.S. Cl. ...................................... 426/387; 426/424
[58] Field of Search ................................ 426/424, 387

[56] References Cited

U.S. PATENT DOCUMENTS

| 2,309,092 | 1/1943 | Berry et al. | 426/424 |
| 2,933,895 | 4/1960 | Adler et al. | 426/424 X |
| 4,409,253 | 10/1983 | Morrison et al. | 426/424 |
| 4,446,162 | 5/1984 | Malizia et al. | 426/424 |
| 4,465,699 | 8/1984 | Pagliaro et al. | 426/424 X |

FOREIGN PATENT DOCUMENTS

| 1807308 | 7/1969 | Fed. Rep. of Germany | 426/424 |
| 1516208 | 6/1978 | United Kingdom | 426/424 |
| 1532547 | 11/1978 | United Kingdom | 426/424 |

OTHER PUBLICATIONS

Sivetz et al, Coffee Processing Technology, 1963, Avi: Westport, Conn., pp. 351–355.

Primary Examiner—Joseph Golian
Attorney, Agent, or Firm—Thomas A. Marcoux; Thomas R. Savoie; Daniel J. Donovan

[57] ABSTRACT

A method of decaffeinating aqueous roasted coffee extracts is disclosed. An organic caffeine solvent is first loaded with essentially hydrolyzed coffee solids. The aqueous roasted coffee extract is contacted with the loaded organic caffeine solvent for a sufficient period of time to transfer at least some of the caffeine from the coffee extract to the caffeine solvent, whereupon the extract is separated from the caffeine-containing solvent. The resultant coffee extract has been found to have noticably more body notes than a coffee extract which is decaffeinated with a solvent that has not been loaded with hydrolyzed coffee solids.

23 Claims, No Drawings

METHOD FOR THE DECAFFEINATION OF ROASTED COFFEE EXTRACTS

This application is a continuation-in-part of our abandoned co-pending application Ser. No. 655,198, filed Sept. 27, 1984 for METHOD FOR THE DECAFFEINATION OF ROASTED COFFEE EXTRACTS.

TECHNICAL FIELD

The present invention relates to a method for decaffeinating aqueous roasted coffee extracts and the products of such method. More particularly, the invention involves loading an organic caffeine solvent with hydrolyzed coffee solids, contacting a roasted coffee extract with the loaded organic caffeine solvent and separating the coffee extract from the then caffeine-containing organic caffeine solvent.

BACKGROUND ART

Numerous decaffeination techniques are known in the art. One widely practiced decaffeination method is disclosed in U.S. Pat. No. 2,309,092 to Berry et al. Green coffee beans are moistened and subsequently extracted with a caffeine-deficient green coffee extract, with the extraction typically taking place in a countercurrent extraction battery Caffeine-laden extract withdrawn from the extraction battery is then decaffeinated by contact with a caffeine solvent. While the method of Berry et al. is quite effective, it is only applicable to the decaffeination of green coffee beans and is not suitable for the decaffeination of extracts of roasted coffee.

The art has generally continued to progress along lines of decaffeination of green extracts. Relatively little progress has been made in technology looking toward the direct decaffeination of the extract of roasted and ground coffee. To be sure, certain patents like that to Adler et al., U.S. Pat. No. 2,933,395 issued Apr. 9, 1960, have offered to the art workers the approach of decaffeinating the extract of roasted and ground coffee; but such arts have not materially advanced until recently to the point of providing a brew quality equal to or exceeding that recoverable by decaffeination of green beans.

Thus, techniques are known for decaffeinating roasted coffee extracts, but the methods are not without certain drawbacks. Belgian Patent Disclosure No. 865,488 of Bolt et al. describes a process in which roasted coffee extract is first decaffeinated with the solvent, the solvent is then contacted with water to transfer the caffeine and unavoidably some non-caffeine solubles, the decaffeinated solvent is returned to the coffee extract and subsequently stripped therefrom; and the caffeine is crystallized from the water phase, which is then discarded. The water phase unavoidably contains an amount of noncaffeine solubles which would contribute important flavor notes but which are instead discarded. The particular flavor notes which are lost with the discarded water phase are the "body" notes which contribute to the overall balance of coffee extract flavor. Without these body notes, the coffee extract and the soluble coffee made therefrom are typically characterized as weak and thin.

A similar decaffeination method is disclosed in U.S. Pat. No. 4,409,253 to Morrison et al. The improvement is said to be in recycling the water phase from which the caffeine has been crystallized back to the incoming caffeinecontaining extract. It appears that the water phase cannot be combined with the decaffeinated extract because of the substantial amounts of caffeine remaining in the water after crystallization. This inefficient recycling of the water phase, with the corresponding increase in the amount of caffeine to be removed, would appear to increase the volume of extract to be decaffeinated, inflating operating costs.

Accordingly, it is an object of the present invention to provide an efficient method for decaffeinating aqueous roasted coffee extracts.

Another object of the invention is to provide a method of decaffeinating aqueous roasted coffee extracts which minimizes the amount of flavor notes lost during decaffeination.

Such improvements as have been noted in the production of decaffeinated extract produced from roasted and ground coffee leave much to be desired from the standpoint of flavor. It would be desirable to provide a decaffeination process which uses roasted and ground coffee, instead of green; is relatively applicable to current processing techniques; and yields a product that can match or exceed the quality extracts derived from decaffeinated green beans. The present invention relates to just such a product.

DISCLOSURE OF THE INVENTION

It has now been found that the objects of the invention are met by a method for decaffeinating roasted and ground coffee extracts which involves "loading" an organic caffeine solvent such as methylene chloride with hydrolyzed coffee solids; contacting a non-decaffeinated roasted and ground coffee extract with the loaded caffeine solvent to effect decaffeination; and separating the decaffeinated extract from the then caffeine-containing organic caffeine solvent. In excess of 96% by weight of the caffeine initially present in the roasted coffee extract can be removed by such methods.

One of the essential features of the present invention is "loading" the organic caffeine solvent with essentially hydrolyzed coffee solids. The term "essentially hydrolyzed coffee solids" is intended to refer to those coffee solids and compounds obtained from roasted coffee grounds after the coffee grounds have been at least thoroughly atmospherically extracted. Such atmospheric extraction, which is well-known to a worker skilled in the art, typically involves extracting between 20% and 25% by weight of the roasted and ground coffee at atmospheric pressure and at about 212° F. Nearly all of the caffeine is atmospherically extracted so it is not a concern that caffeine will be loaded in the solvent inhibiting subsequent decaffeination of the roasted coffee extract. Further extraction of the coffee grounds provides what is meant by "essentially hydrolyzed coffee" solids which encompasses both coffee solids and additional compounds, such as coffee oil, tars and the like, that are not "solids" in the strictest sense but are obtained from the coffee grounds along with the solids.

It has surprisingly been found that the hydrolyzed coffee solids loaded in the organic caffeine solvent prevent the loss of important flavor notes, particularly body notes, during subsequent decaffeination of a separate extract of roasted and ground coffee. This is so, even though the compounds initially present in the roasted coffee extracts prior to decaffeination responsible for the body notes are not thought to be similar to the hydrolyzed coffee solids. It is believed, without being limited to any given theory, that the essentially hydrolyzed coffee solids in the organic caffeine solvent retard the transfer of the compounds responsible for the body notes from roasted coffee extract to the solvent during decaffeination. Thus, in an experiment in which hydrolyzed coffee solids were added to an extract that was decaffeinated by an unloaded solvent as a control, the resulting extract was found not to have the desirable body notes. Such a result suggests body notes found in the decaffeinated extract of the present invention are not transferred from the loaded organic caffeine solvent but are instead retained in the roasted coffee extract in which they were already present.

The essentially hydrolyzed coffee solids may be loaded in the caffeine solvent by any of alternative means. According to one embodiment, the organic caffeine solvent is contacted with a hydrolyzed coffee extract prepared from coffee that has been at least atmospherically extracted; the term "at least" implies that in addition to the atmospherically extracted solids, solids recovered when the roasted and ground coffee are exposed to a superatmospheric pressure and at temperatures greater than 212° F. are likewise advantageously recovered in a decaffeination process. Contact of the organic caffeine solvent and hydrolyzed coffee extract may be in any manner providing good liquid-liquid contact. For instance, the caffeine solvent may be contacted with the hydrolyzed coffee extract in an agitated batch tank. Most preferably, the organic caffeine solvent and hydrolyzed coffee extract are contacted in a continuous liquid-liquid column such as a Karr column or rotating disk contactor column. For the continuous column, the caffeine solvent is continuously fed to one end of the column and withdrawn from the opposite end and the hydrolyzed coffee extract is continuously fed to the second end of the column and typically maintained as the dispersed phase within the column, being withdrawn from the opposite end to which it is fed. The particular liquids fed to the top and bottom of the column depend on the relative densities of the two liquids, with the heavier one being fed to the top of the column.

The hydrolyzed coffee extract used to load the organic caffeine solvent may be obtained from any of numerous sources. Autoclaved coffee solids are an example of a suitable hydrolyzed coffee extract. Autoclaved coffee solids are defined as those coffee solids which are extracted above 212° F. and above atmospheric pressure after the coffee charge has been atmospherically extracted. For instance, an extract of autoclave coffee solids may be the secondary extract obtained from a split-extraction percolation system as described, for example, in U.S. Pat. No. 3,790,689 to Pitchon et al. on Feb. 5, 1974. Alternatively, the hydrolyzed coffee extract may be obtained by hydrolyzing spent coffee grounds in the presence of an acid catalyst (as described in U.S. Pat. No. 4,508,945 to Fulger et al.) or by thermal means without the incorporation of an acid catalyst The hydrolyzed coffee extract may also be obtained from a waste stream such as from the blow down liquor pressed from spent grounds discharged from an extraction battery.

Alternately, it is possible to load the organic caffeine solvent by direct contact with spent coffee grounds to transfer hydrolyzed coffee solids into the solvent.

After contact with the caffeine solvent to load it, the hydrolyzed extract may be stripped of residual solvent and retained for later combination with the decaffeinated roasted coffee extract. The contacted hydrolyzed extract may also be recycled to load additional organic caffeine solvent.

Important parameters for the loading of the organic caffeine solvent, that is, the transfer of the essentially hydrolyzed coffee solids to the solvent, include the weight ratio of solvent to hydrolyzed coffee extract, the concentration of the hydrolyzed coffee solids in the extract, the temperature of the contact between the organic caffeine solvent and hydrolyzed coffee extract and the efficiency of the contact. The efficiency of the contact is largely determined by the amount of agitation of the two liquids, with the greatest agitation short of forming an emulsion or flooding a continuous column being desirable. It has been found to be most preferable to load the organic caffeine solvent with the essentially hydrolyzed coffee solids at a level of from about 0.1% to 1.0% by weight coffee solids. In order to do so, it is desirable to contact the caffeine solvent with the hydrolyzed coffee extract in a weight ratio of from 1:1 to 10:1 organic caffeine solvent to aqueous hydrolyzed coffee extract. The preferred aqueous hydrolyzed coffee extract concentration for such a weight ratio range is from 10% to 40% by weight essentially hydrolyzed coffee solids. The temperature of the contact is preferably between about 70° F. and 180° F., with a lower temperature often leading to the formation of undesirable emulsion. If the boiling point of the organic caffeine solvent is less than the loading temperature, the contact must be at a pressure greater than atmospheric. Operation of the liquid-liquid contactor within the described conditions will load the organic caffeine solvent to the desired 0.1% to 1.0% by weight essentially hydrolyzed coffee solids level.

In an alternative embodiment, the organic caffeine solvent is loaded with the hydrolyzed coffee solids by contact with spent coffee grounds that have been at least atmospherically extracted. Most preferably, the grounds have had about 20% to 55% of the starting weight of the roasted and ground coffee previously extracted with most of the caffeine also being extracted. Contact of the caffeine solvent and spent coffee grounds may be carried out in any vessel providing good solid-liquid contact. For instance, the grounds may be slurried in a solvent such as methylene chloride in a batch tank for a period of time sufficient to load the solvent to the desirable hydrolyzed coffee solids level. Alternatively, spent coffee grounds may be placed as a fixed bed in an elongated vessel with the caffeine solvent being recirculated through the bed until the preferred coffee solids level has been reached.

As it is preferable to load the organic caffeine solvent with the hydrolyzed coffee solids at a level of from about 0.1% to 1.0% by weight coffee solids, the important parameters for the loading of the solvent include the weight ratio of organic caffeine solvent to spent coffee grounds and the temperature of the contact of the solvent and spent grounds. The spent coffee grounds are preferably contacted with the organic caffeine solvent at a weight ratio (dry basis spent grounds) of from 1:1 to 10:1 organic caffeine solvent to spent coffee grounds. The preferred temperature range of the contact is between about 70° F. and 180° F. The 180° F. temperature is the preferred uppermost limit to prevent chemical breakdown of the hydrolyzed coffee compounds. Contacting of the spent coffee grounds with the caffeine solvent according to the conditions set forth provides for the desired loading of the caffeine solvent at the preferred 0.1% to 1.0% by weight hydrolyzed coffee solids level.

Regardless of the embodiment chosen, the organic caffeine solvent is preferably one of the organic solvents which are known in the art to be good decaffeination solvents. The acetates, such as ethyl or butyl acetate, the solvents sold as freons, triglycerides and the halogenated hydrocarbon solvents are all useful. Most preferably, the caffeine solvent is methylene chloride which has long been known to be an effective solvent. Methylene chloride is widely available, relatively inexpensive and has been approved for use in decaffeinating coffee. It is desirable to load the methylene chloride at a temperature somewhat below the hereinbefore indicated 180° F. Moreover, methylene chloride has a specific gravity of about 1.4 so it is preferable to feed the caffeine solvent to the top of any continuous liquid-liquid contactor.

Once the organic caffeine solvent has been loaded with the desired level of hydrolyzed coffee solids, the loaded caffeine solvent may be used to decaffeinate a roasted coffee extract. The roasted coffee extracts intended for use herein are those extracts typically obtained by the operation of a commercial coffee extraction system. Such a commercial extraction system most often comprises a countercurrent extraction battery of approximately 6 to 8 sections containing roasted coffee with varying degrees of extraction. Feed water at approximately 350° F. is fed to the section containing the most extracted coffee and the roasted coffee extract is withdrawn from the section containing the freshest coffee. Periodically, the section containing the spent coffee is isolated, a section containing fresh roasted and ground coffee is added to the battery and the flow is adjusted. Alternatively, the coffee extract may be the extract withdrawn from the first stage extraction column of a split-extraction percolation system described in, for example, U.S. Pat. No. 3,790,689. The resultant coffee extract after evaporation contains anywhere from 10% to 50% by weight total coffee solubles and from 0.1% to 5% by weight caffeine. The extract also contains much of the volatile and non-volatile flavor and aroma compounds initially present in the roasted coffee.

While loading the organic caffeine solvent according to the method of the present invention is effective in preventing the loss of the non-volatile body notes, the organic caffeine solvent tends to remove the volatile flavor and aroma compounds and so it is desirable to strip the volatile compounds from the extract prior to decaffeination. Such stripping of the volatile compounds may be carried out by any of the techniques known in the art. Most preferably, the roasted coffee extract is stripped with steam so as to remove substantially all of the volatile flavor and aroma compounds therefrom. The evolving steam containing the volatile compounds can be collected by known techniques for eventual addition to the decaffeinated coffee extract. For instance, the steam may be trapped as a frost or condensed in water-cooled heat exchangers to provide an aqueous condensate. The aqueous condensate may be added to the decaffeinated coffee extract as is or may be fractionated into specific aroma fractions according to known techniques. Certain of the aroma fractions are then added to the decaffeinated extract as desired to provide an extract having principally those flavor notes of the fractions added.

Although it is preferable to strip the volatile flavor and aroma compounds from the extract prior to decaffeination, it is by no means necessary to do so. However, since the major utility of the present invention resides in an aromatized roasted decaffeinated extract, it is preferred to strip the volatile aromas prior to extract decaffeination and thence collect and add same back, as previously mentioned.

In any event, a roasted coffee extract, whether stripped or not, is contacted with the loaded organic caffeine solvent so as to remove at least a portion of the caffeine initially present in the roasted coffee extract. It will be appreciated that virtually any level of decaffeination may be achieved, from less than 10% by weight of the caffeine initially present to better than 98% by weight of the caffeine initially present. It is typically desirable to remove at least 50% by weight of the caffeine initially present. Commercial applications most often require better than 97% by weight decaffeination of the coffee extract.

The degree of decaffeination is related to the parameters for the contact of the loaded organic caffeine solvent and the roasted coffee extract. The important parameters include the weight ratio of the loaded caffeine solvent to the non-decaffeinated coffee extract, the concentration of coffee solids in the extract, the temperature of the contact and the efficiency of the contact. It has been found that the weight ratio in the liquid-liquid contactor is most preferably from about 1:1 to 10:1 loaded organic caffeine solvent to roasted coffee extract. The preferred roasted coffee extract concentration is from 10% to 40% by weight coffee solids. The temperature is desirably maintained between about 70° F. and 180° F., with a temperature much in excess of 180° F. tending to damage the flavor of a coffee extract. Of course, if the boiling point of the loaded organic caffeine solvent is below the decaffeination contact temperature, the decaffeination of the extract takes place at a pressure greater than atmospheric. Thus these conditions match those employed substantially in the initial loading of the solvent, set forth hereinabove. The efficiency of the contact is again largely determined by the degree of agitation of the two liquids, with the greatest agitation short of forming an emulsion or flooding a continuous column being most preferable.

Roasted coffee extract from which at least a portion of the caffeine has been removed is eventually withdrawn from the liquid-liquid contactor. Inasmuch as the decaffeinated extract will usually contain residual organic caffeine solvent, it is desirable to strip the residual solvent therefrom before processing the extract into a finished soluble coffee. Hence, the residual solvent is stripped from the extract and the extract can then be dried into a decaffeinated soluble coffee.

Drying of the extract, whether or not the volatile flavor and aroma compounds have been added back, may be by any of the means known in the art. Spray drying and freeze drying are particularly preferred methods.

The organic caffeine solvent withdrawn from the liquid-liquid contactor during decaffeination may be treated further to recover the caffeine therein. One well known method of recovering the caffeine involves adding the caffeine-containing solvent to a tank of hot water so as to evaporate the solvent and transfer whatever is dissolved therein to the water. The organic caffeine solvent is most preferably condensed and recycled for further use in accordance with the method of the present invention. The caffeine transferred to the water is conveniently crystallized therefrom by techniques apparent to a worker skilled in the art.

The following examples are intended to illustrate certain embodiments of the present invention. The examples are not meant to limit the invention beyond what is claimed below.

EXAMPLE 1

Methylene chloride was "loaded" with autoclaved coffee solids and the loaded methylene chloride was employed to decaffeinate an aqueous roasted coffee extract.

I. Solvent Pretreatment

Pure methylene chloride was treated with autoclaved coffee solids to produce a decaffeination medium which was rich in non-caffeine coffee solids but substantially free of caffeine as follows.

Methylene chloride at 110° F. was fed into the top of a two inch diameter Karr column. A 26.55% aqueous solution of autoclaved coffee solids at 110° F. was fed into the bottom end of the column. The autoclaved coffee solids solution was obtained as follows. A two column train was extracted for flavor and caffeine by atmospheric extraction and the extract was preserved as a quality brew but not for use in the present process: a 300° F. fresh water charge to the bottom of the first of the two columns was withdrawn at 245° F. and circulated upwardly into the second column from which it was withdrawn at 230° F., cooled to 100° F. and stored; this atmospheric extract had 11.5% coffee solids; the extract had 0.4% caffeine.

The atmospherically spent coffee column was thereafter introduced to the process of the present invention. Four conventional columns of the spent coffee were subjected to sequential autoclaving; fresh water at 365° F. was charged to the bottom of the first column and recovered at the top, processed through the three remaining columns in like manner at progressively lowered temperature, and recovered at 290° F. from the top of the fourth such column, whereupon the extract was cooled to 100° F.; it possessed 7% soluble solids and 0.023% caffeine; the temperature drop across the four columns was fairly uniform. The extract recovered represented the autoclaved coffee solids solution to be processed further in accordance with this invention; the solution comprised 78.5% (d.b.) carbohydrates, 15.8% measured as total sugars (Kjeldahl), 2.1% chlorogenic acid (d.b.), and 0.2% potassium.

The autoclaved extract (the hydrolyzed coffee extract) was concentrated in a centritherm evaporator to the aforesaid 26.55% solution. This solution contains some solids that will be transferrable to the methlylene chloride but whose presence will prevent flavor losses that would otherwise occur during decaffeination. The coffee solids solution was agitated (120 spm at 1" stroke length) in the Karr column and the column exhibited the following pressure profile; 22 psig at the top, 25 psig in the middle, and 27 psig at the bottom. The Karr column had an effective length of contact of eight feet, the column itself having an overall length of twelve feet to include a separation zone at the top and a solvent collection zone at the bottom. The methlylene chloride had a downward flow rate of 120 cc per minute and the solution of autoclaved solids was fed upwardly through the unit at a flow rate of 25 cc per minute. The thus treated and "loaded" methylene chloride had an approximate level of 0.17% soluble hydrolyzed coffee solids and a neglible level of below approximately 0.015% caffeine. The solvent recovered at the bottom of the Karr column represented the loaded methylene chloride for use in decaffeination; the processed autoclaved stream recovered at the top of the Karr column may be stripped of residual methylene chloride by conventional methods and the solids recovered for recombination with the previously saved atmospheric extract, all of which forms no part of the present invention.

II. Decaffeination

An aqueous extract of roast and ground coffee of approximately 12% solids was first stripped of any volatile flavor and/or aroma compounds by passing the extract through a centitherm before decaffeination, the inlet to the centitherm being at about 90° F. and the outlet at about 130° F., the extract being concentrated to 55% solids; the solids solution was thereafter diluted to about 20% soluble solids and contained about 0.8% caffeine. The flavor compounds were collected and processed by conventional means for later addition to the decaffeinated extract prior to spray drying. The loaded methylene chloride produced in Section I. of this example was utilized to decaffeinate the extract to achieve an average percent decaffeination of 96.3%. The extract operating conditions during decaffeination were as follows: the 2" Karr column as above was employed and the column was agitated at 120 spm at a 1" stroke length; the extract for decaffeination and the solvent were both fed at 110° F. to the Karr column; the pressure profile was the same as in Section I. of this example above. The extract flowed upwardly through the column at 25 cc per minute and the loaded methylene chloride flowed downwardly at 120 cc per minute; this resulted in a derivable solvent/extract ratio of 4.8/1 by volume and 5.8/1 by weight. The decaffeinated extract was further processed to remove residual solvent and constituted the useful product of the present invention; thus, the extract drawoff was stripped of methylene chloride by passage through a flash evaporation to achieve methylene chloride levels in the decaffeinated extract of less than 50 p.p.m. and thereafter spray dried.

This extract could be tasted as extract or spray dried and tasted upon reconstitution. In either event, the decaffeinated coffee extracts compared favorably against a similar decaffeinated coffee extract produced in a similar process with the one difference being that the methylene chloride was not "loaded" with hydrolyzed coffee solids as in Section I of this example. The decaffeinated coffee produced according to the present invention was preferred in that it was perceived as being more flavorful and possessed more body notes, namely those that would be typically associated with product produced by conventional green bean decaffeination methods of the prior art. The flavor comparisons are shown in the columnar description identified as Table A below.

TABLE A

COMPARISON OF TREATED AND UNTREATED SOLVENT DECAFFEINATION

| SAMPLE | PREFERENCE | EVALUATION/ COMMENTS |
|---|---|---|
| Extract Decaffeinated with Untreated MeCl$_2$ | 4.0 | Bland, washed out, thin, stripped |
| Extract Decaffeinated with | 5.5 | Good body, slight caramel flavor, good |

TABLE A-continued
COMPARISON OF TREATED AND
UNTREATED SOLVENT DECAFFEINATION

| SAMPLE | PREFERENCE | EVALUATION/ COMMENTS |
|---|---|---|
| Treated MeCl$_2$ | | |

PREFERENCE SCALE
9 = Like extremely
8 = Like very much
7 = Like moderately
6 = Like slightly
5 = Like nor dislike
4 = Dislike slightly
3 = Dislike moderately
2 = Dislike very much
1 = Dislike extremely Of greatest use in accordance with is invention, however, will be decaffeinated coffee extracts to which the stripped aromas and flavor values have been added and the solids recovered from the caffeine-rich methylene chloride. Thus, the volatile flavor and aromas which were stripped from the extract were recovered, concentrated and added to the decaffeinated extract of the present invention along with flavor components recovered from the caffeine rich methylene chloride exiting the top of the Karr column in II. above. The latter solids are typically recovered in accordance with the process set forth in U.S. Pat. No. 4,505,940 to Jones et al., dated Mar. 19, 1985, ref. col. 8, line 5 et seq. of said patent. The aromatized extract produced by addition of these recovered aromatic and flavor constituents can thereafter be spray dried and again compared to a conventional "green bean" decaffeination product representative of those presently marketed as Sanka ® Decaffeinated coffee. Most significantly, such a product compares very favorably as indicated by the tabulations in Table B below.

TABLE B
COMPARISON OF INSTANT SANKA VERSUS
DECAFFEINATED PRODUCT USING
SOLVENT PRETREATMENT

| SAMPLE | PREFERENCE | EVALUATION/ COMMENTS |
|---|---|---|
| Instant Sanka | 6 | Cereal, slightly green, slight burnt caramel flavor |
| Product Decaffeinated with Treated MeCl$_2$ (Includes recovered volatile and non-volatile flavor streams) | 6 | Slight cereal flavor, good body, balanced, slightly caramel, slightly acidic |

EXAMPLE II

An alternate source of hydrolyzed coffee solids can be derived from the direct contact of spent ground coffee with methylene chloride to provide a similar "loaded" decaffeination solvent.

I. Solvent Preparation.

14 pounds of spent grounds derived from a commercial percolation system, approximately 50% solids removal, containing 50% water, were placed in an elongated vessel. 15 gallons of methylene chloride at room temperature and 14 psig were pumped through the elongated bed at 350 cc/minute, for 5 hours. The methylene chloride was present in a sealed system which was recycled during this time. This produced a loaded methylene chloride having an approximate level of 0.42% soluble solids and a negligible level of caffeine.

II. Decaffeination

An aqueous extract of roast and ground coffee was first stripped of any volatile flavor and/or aroma compounds by passing the extract through a centritherm before decaffeination. On analysis, prior to decaffeination, the stripped extract was found to contain 0.9% caffeine, and about 25% soluble solids. The loaded methylene chloride produced in Section I of this Example above was utilized to decaffeinate the extract to achieve an average percent decaffeination of 98.4%. The extract operating conditions during decaffeination were as follows:

Operating Conditions: 2" Karr column
Agitation: 120 SPM at 1 inch stroke length
Temperature:
    extract feed 110° F.
    solvent feed 110° F.
Pressure:
    top 22 psig
    middle 25 psig
    bottom 27 psig
Extract Flowrate: 30 cc/min
Solvent Flowrate: 130 cc/min
Solvent/Extract: 4.3/1 by volume (5.2/1 by weight)
Solvent Carryover in Extract Drawoff: 30% by volume The extract drawoff was stripped of methylene chloride by passing through a flash evaporator as in Example I. The extract was then aromatized and spray dried.

What is claimed is:

1. A method of decaffeinating aqueous roasted coffee extracts which comprises:
   (a) loading an organic caffeine solvent with hydrolyzed roasted coffee solids obtained from roasted coffee grounds after the grounds have been at least thoroughly atmospherically extracted of at least 20% of the solids therein;
   (b) contacting an aqueous extract of roasted and ground coffee with the loaded organic caffeine solvent of (a) for a period of time sufficient to transfer at least 96% of the caffeine from the aqueous roasted coffee extract to the loaded caffeine solvent;
   (c) separating the roasted decaffeinated coffee extract from which the caffeine has been transferred from the then caffeine-containing loaded organic caffeine solvent; and
   (d) drying the roasted decaffeinated coffee extract.

2. A method as in claim 1 wherein the hydrolyzed coffee extract in step (a) is at a concentration of from 10% to 40% by weight hydrolyzed coffee solids.

3. A method as in claim 2 wherein the organic caffeine solvent is contacted with the hydrolyzed coffee extract in a liquid-liquid contactor at a weight ratio of from 1:1 to 10:1 organic caffeine solvent to hydrolyzed coffee extract.

4. A method as in claim 3 wherein the organic caffeine solvent is contacted with the hydrolyzed coffee extract at a temperature of from 70° F. to 180° F.

5. A method as in claim 4 wherein the loaded organic caffeine solvent has a hydrolyzed coffee solids concentration of from 0.1% to 1.0% by weight.

6. A method as in claim 1 wherein the organic caffeine solvent is loaded with hydrolyzed coffee solids by contacting the caffeine solvent with an aqueous hydrolyzed coffee extract prepared from the acid hydrolysis or thermal hydrolysis without the incorporation of an acid catalyst of roasted coffee spent grounds which have been at least atmospherically extracted.

7. A method as in claim 6 wherein the hydrolyzed coffee extract is at a concentration of from 10% to 40% by weight hydrolyzed coffee solids.

8. A method as in claim 7 wherein the organic caffeine solvent is contacted with the hydrolyzed coffee extract in a liquid-liquid contactor at a weight ratio of from 1:1 to 10:1 organic caffeine solvent, to hydrolyzed coffee extract.

9. A method as in claim 8 wherein the organic caffeine solvent is contacted with the hydrolyzed coffee extract at a temperature of from 70° F. to 180° F.

10. A method as in claim 9 wherein the loaded organic caffeine solvent has a hydrolyzed coffee solids concentration of from 0.1% to 1.0% by weight.

11. A method as in claim 1 wherein the organic caffeine solvent is loaded with essentially hydrolyzed coffee solids by contacting the caffeine solvent with spent coffee grounds.

12. A method as in claim 11 wherein the spent coffee grounds have had about 10% to 55% by weight of the starting weight of the roasted and ground coffee previously extracted.

13. A method as in claim 12 wherein the organic caffeine solvent is contacted with the spent grounds in a solid-liquid contactor at a weight ratio (dry basis spent grounds) of from 1:1 to 10:1 organic caffeine solvent to spent coffee grounds.

14. A method as in claim 13 wherein the organic caffeine solvent is contacted with the spent coffee grounds at a temperature of from 70° F. to 180° F.

15. A method as in claim 14 wherein the loaded organic caffeine solvent has a hydrolyzed coffee solids concentration of from 0.1% to 1.0% by weight.

16. A method as in claim 1 wherein the roasted coffee extract has a total solids concentration of from 10% to 50% by weight and a caffeine concentration of from 0.1% to 5% by weight.

17. A method as in claim 16 wherein the organic caffeine solvent is a halogenated hydrocarbon solvent.

18. A method as in claim 17 wherein the organic caffeine solvent is methylene chloride.

19. A method as in claim 18 wherein the roasted coffee extract is contacted with the loaded organic caffeine solvent in a liquid-liquid contactor at a weight ratio of from 1:1 to 10:1 organic caffeine solvent to roasted coffee extract.

20. A method as in claim 19 wherein the roasted coffee extract is contacted with the loaded organic caffeine solvent at a temperature of from 70° F. to 180° F.

21. A method as in claim 20 which further comprises stripping the volatile flavor and aroma components from the roasted coffee extract prior to the contact of the extract and the loaded organic caffeine solvent and collecting the volatile flavor and aroma components for subsequent addition to the coffee extract.

22. A method as in claim 21 which further comprises stripping residual organic caffeine solvent from the roasted coffee extract from which a portion of the caffeine has been transferred; and adding the collected volatile flavor and aroma components to the coffee extract.

23. A method as in claim 1 which further comprises recovering the caffeine from the caffeine-containing loaded organic caffeine solvent and recycling the organic caffeine solvent to the method of claim 1.

* * * * *